US007735780B2

United States Patent

Coles

(10) Patent No.: US 7,735,780 B2
(45) Date of Patent: Jun. 15, 2010

(54) AIRCRAFT STRINGER CLIP AND RELATED METHODS

(75) Inventor: Brian Alan Coles, Greeneville, TX (US)

(73) Assignee: L-3 Communications Integrated Systems, L.P., Greenville, TX (US)

(*) Notice: Subject to any disclaimer, the term of this patent is extended or adjusted under 35 U.S.C. 154(b) by 388 days.

(21) Appl. No.: 12/004,130

(22) Filed: Dec. 20, 2007

(65) Prior Publication Data

US 2009/0159745 A1 Jun. 25, 2009

(51) Int. Cl.
*B64C 1/12* (2006.01)

(52) U.S. Cl. .................................................... 244/132

(58) Field of Classification Search ................. 244/131, 244/132, 119
See application file for complete search history.

(56) References Cited

U.S. PATENT DOCUMENTS 4,896,851 A 1/1990 Shaull ......................... 248/72
5,127,139 A 7/1992 McCowin et al. .............. 29/26
5,352,078 A 10/1994 Nasu .......................... 411/337
5,477,596 A 12/1995 Schlosstein et al. ............ 29/33
5,797,573 A 8/1998 Nasu ..................... 248/231.31
6,012,877 A 1/2000 McCowin et al. .............. 408/1
6,141,848 A 11/2000 Yousko et al. ................ 29/33
7,635,106 B2 * 12/2009 Pham et al. ................ 244/131
2009/0212154 A1 * 8/2009 Aho-Mantila et al. ......... 244/54

* cited by examiner

*Primary Examiner*—Timothy D Collins
(74) *Attorney, Agent, or Firm*—O'Keefe, Egan, Peterman & Enders, LLP

(57) ABSTRACT

An aircraft stringer clip and related methods are disclosed that provide an apparatus for attaching aircraft elements to an aircraft stringer. In one embodiment, the stringer clip is a three-piece clamp assembly spanning the width of an aircraft stringer and including a single bottom member and two opposing top members that are configured to be engagingly coupled. The top and bottom members of the stringer clip are preferably made of rigid, but light-weight and flame retardant material.

22 Claims, 4 Drawing Sheets

200
403B
403A
208
224
402
222
202
102
214
212
212
401
220
401
206
305
210
204

AIRCRAFT STRINGER CLIP AND RELATED METHODS

TECHNICAL FIELD OF THE INVENTION

The inventions described herein relate to techniques and methods for attaching structural attachments to an aircraft stringer and, more particularly, to stringer clips for aircraft stringers.

BACKGROUND

Current apparatus and methods for attaching structural attachments to a structural stringer of an airplane exist in the art. Airplane stringers extend longitudinally along the fuselage of an aircraft and attach to the aircraft skin and transverse frame members. Airplane stringers also extend outwardly along the wing of an airplane and attach to the aircraft skin of the wing and transverse wing frame members.

FIG. 1 (Prior Art) is a prior art figure showing a portion of an airplane fuselage including skin 101 supported on a plurality of stringers, such as stringer 102. As depicted, the stringers are also connected to an airplane frame member 103. In manufacturing, stringers are often rolled from sheets of aluminum and vary in thickness and dimensions. Stringers are commonly formed into hat-shaped, S-shaped or Z-shaped cross-sections. The stringer 102, for example, depicted in FIG. 1 is a hat-shaped stringer. The top of the hat for stringer 102 is attached to the skin 101, and the two flanges of the stringer 102 are attached to the transverse frame member 103.

Stringer clips are attached to stringers and used to hold non-structural elements, such as wire bundles, air conditioning conduits, hydraulic lines, electronic equipment and other desired interior elements of an aircraft. One prior technique for attaching stringer clips to aircraft stringers was to drill holes through stringer flanges in order to attach the stringer clips. This technique, however, has the disadvantage of causing removal of protective coatings, increased stresses, and stress corrosion around the drill holes. It is appreciated that the stringers must remain in place during various gravitational stresses, vibrational stresses, and other forces experienced by an aircraft. A modern jet aircraft can use thousands of stringer clips, and it is desirable for these stringer clips to have minimal or no impact on the structural integrity of the stringers and the aircraft.

An example stringer clip is described in U.S. Pat. No. 4,896,851. The disclosed stringer clip provides a solution that uses an adjustable flexible strap to secure the stringer clip in place. An attachment mechanism for interior aircraft elements is also located centrally with respect to the strap. While this stringer clip is relatively easy to install, and one size fits a large number of stringer sizes and shapes, this stringer clip is primarily suitable for light attachments because it tends to loosen under heavy loading. In addition, the flexible strap attachment does not fill the middle channel of the stringer webs, leaving it open. As such, the stringer can be pinched and distorted if the strap is pulled too tightly and/or if the attached structures are relatively heavy. This distortion of the stringer can have a negative impact on the structural integrity of the aircraft and, therefore, is undesirable.

SUMMARY OF THE INVENTION

An aircraft stinger clip and related methods are disclosed that provide an apparatus for attaching aircraft elements to an aircraft stringer. In one embodiment, the stringer clip is three-piece clamp assembly spanning the width of an aircraft stringer and including a single bottom member and two top members that are configured to be engagingly coupled. A single bottom member of the stringer clip fits centrally on the interior side of an aircraft stringer and has two thru holes on either end configured to match threaded bore holes on the two top members. The single bottom member also includes a central threaded bore hole that can be used for attaching aircraft elements. The two top members of the stringer clip have threaded bores holes configured to match the thru holes in the bottom member. When the bottom member is engaged with the two top members using bolts, the stringer is clamped between the two top members and the single bottom member. The top and bottom members of the stringer clip are preferably made of rigid, but light-weight and flame retardant material. As described below, other features and variations can be implemented, if desired, and a related method can be utilized, as well.

DESCRIPTION OF THE DRAWINGS

It is noted that the appended drawings illustrate only exemplary embodiments of the techniques described herein and are, therefore, not to be considered limiting of its scope, for the techniques may admit to other equally effective embodiments.

DETAILED DESCRIPTION

The embodiments described herein provide stringer clips and related methods for attaching interior aircraft elements to an aircraft stringer. More particularly, a stringer clip is disclosed having a three piece clamp assembly attached, for example, using a plurality of bolts.

The stringer clip is preferably constructed of rigid material to evenly distribute load across the stringer clip, and thereby the stringer, and allow for attachment of equipment having various weights, shapes and sizes. The stringer clip is also preferably configured to fill the channel in the middle of the stringer to reduce distortion of the stringer. Advantageously, the disclosed stringer clip will not slip or loosen under load, and installation of the stringer clip is achieved without drilling into the stringer web or stringer caps.

FIGS. 2-8 provide various views of the stringer clip for attaching aircraft elements to a structural stringer. As indicated above, Stringer clips are attached to stringers and used to hold non-structural elements, such as wire bundles, air conditioning conduits, hydraulic lines, electronic equipment and other desired interior elements of an aircraft.

Figure 1:
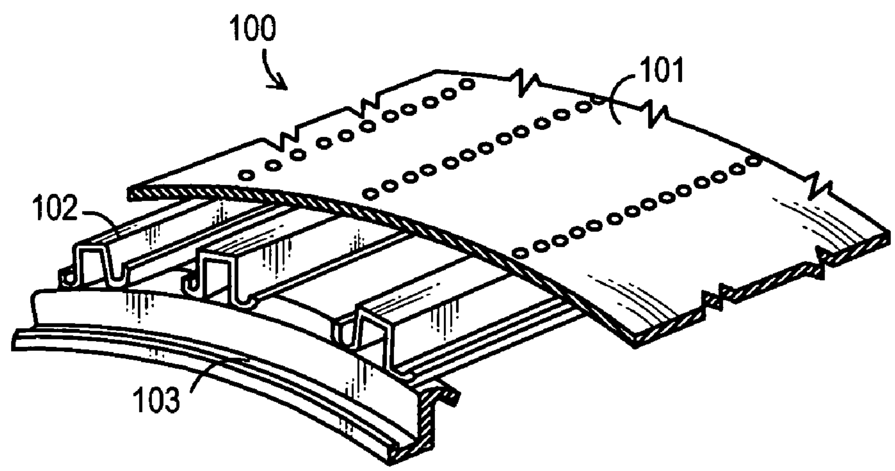
FIG. 1 (Prior Art) is a perspective view of a prior art airplane fuselage skin with underlying aircraft stringers.
Figure 2:
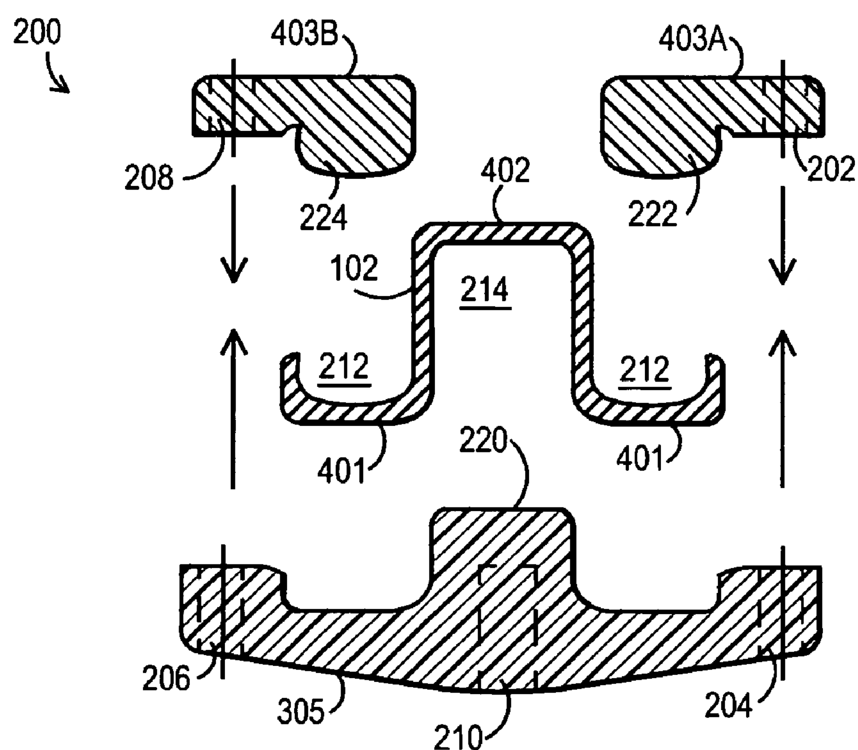
FIG. 2 is a side view of a stringer clip including a bottom member and two top members positioned with respect to an aircraft stringer.

FIG. 2 is a cross-section view 200 of a stringer clip including a bottom member 305 and two opposing top members 403A and 403B positioned with respect to an aircraft stringer 102. The aircraft stringer 102 has is hat-shaped with a top edge 402 and two flanges 401. As indicated above, the top edge 402 is used to attach to the aircraft skin, and the two flanges 401 are used to attach to transverse aircraft frames. The top member 403A has a threaded bore hole 202. This bore hole 202 is aligned with a thru hole 204 in the bottom member 305. Similarly, top member 403B has a threaded bore hole 208. This bore hole 208 is aligned with a thru hole 206 in the bottom member 305. The bottom member 305 also includes a centrally positioned threaded bore hole 210 configured to engage a bolt that can be used to attached elements to the stringer 102. In addition, the bottom member 305 is configured to have a center portion 220 that will position within the center channel portion 214 of the stringer 102 thereby providing additional structural support for the stringer 102. In addition, the top members 403A and 403B are configured to have a portion 222 and 224 configured to engage edge channel portions 212 of the flanges 401 of the stringer 102. The threaded bore holes 202, 208 and 210 are each configured to engage a bolt. The bore holes could also be non-threaded and could be provided with a threaded insert that is configured to engage a bolt. It is noted that thru holes 204 and 206 are non-threaded to allow a bolt to pass through them and engage the threads provided by bore holes 202 and 208. If both parts were threaded, is would be difficult to align them such that a fastener can be installed. However, threads could be added if desired.

It is further noted that other attachment mechanisms could also be utilized, as desired, to couple the bottom member 305 to the opposing top members 403A and 403B. It is also noted that the use of bottom and top are simply used to distinguish the opposing elements of the stringer clip. These terms could be switched, or the terms first and second could be used instead, while still distinguishing the opposing elements. It is further noted that the three-piece stringer clamp described herein could be applied to stringers having different cross-section shapes. In such alternative embodiments, the shapes for the bottom member 305 and the top members 403A and 403B could be adjusted to match the shape of the stringer cross-sectional shape.

Advantageously, the stringer clip attaches to both stringer flanges 401 and provides support in the center channel portion 214 of the stringer to reduce spreading and/or pinching of the stringer cross-section, as well as reducing asymmetric torque of the stringer 102. The stringer clip offers about twice or more of the load bearing surface as current stringer clips. Threaded inserts can also be used within the bore holes to create better attachments. In addition, the stringer clips are designed to be contoured with respect to the stringer 102 in order to eliminate spinning during installation, resulting in a much stronger and reliable mounting solution for structural attachments, such as blankets, interphones, lights, wiring adels, fire extinguishers, structural assemblies, and other interior aircraft elements. Further, the stringer clip can hold miscellaneous installations that usually require drilling holes into a stringer 102, but without having to drill holes into the stringer 102.

Figure 3:
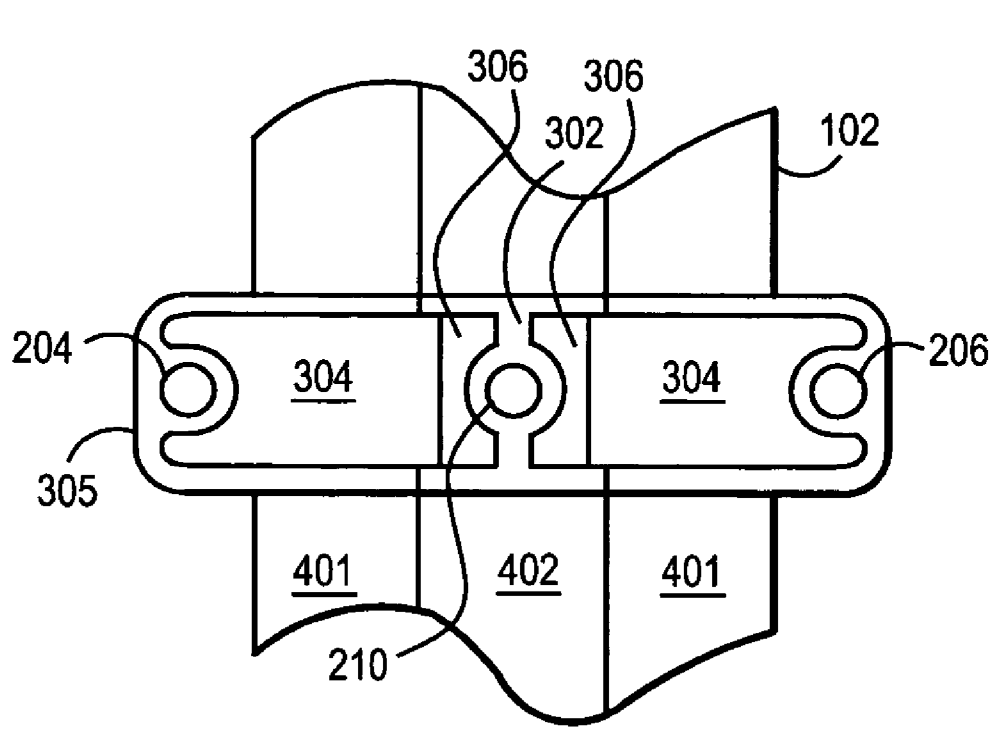
FIG. 3 is a bottom view of a stringer clip with respect to an aircraft stringer.

FIG. 3 is a bottom view 300 of a stringer clip with respect to an aircraft stringer 102. As described above, the bottom member 305 has thru hole 204, thru hole 206 and threaded bore hole 210. The top edge 402 and flanges 401 of the aircraft stringer 102 are also indicated. It is further noted that the bottom member 305 may be constructed of a rigid plastic or other molded material and can be configured to have hollowed out regions, if desired. Still further, as depicted in FIG. 3, area 302 represents the bottom edge of the bottom member 305. The regions 304 are recessed and shaped to match the contour of the flanges 401 of the stringer 102. The regions 306 are also recessed and shaped to match the contour of the middle portion of the stringer including top edge 402. A perspective view of the bottom member 305 is provided in FIG. 8 to show the hollowed out regions and contour.

Figure 4:
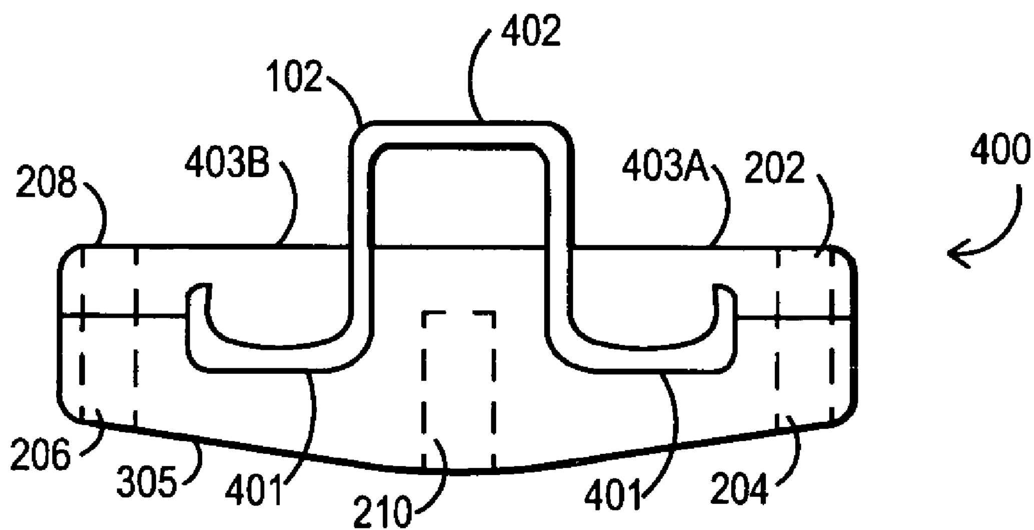
FIG. 4 is a cross-section view of a stringer clip with respect to an aircraft stringer.

FIG. 4 is a cross-section view 400 of a stringer clip with respect to an aircraft stringer 102. As described above, the stringer clip has a three piece assembly with the top pieces 403A and 403B coupling to the back of each stringer flange 401. A stringer skin attachment face or edge 402 is also shown. The two top members 403A and 403B of the stringer clip have threaded bore holes 202 and 208, respectively, that match up to the threaded bore holes 204 and 206 in the bottom member 210. The two top members 403A and 403B are configured to be engagingly secured to the bottom member 305, for example, with the use of bolts. The stringer 102 is thereby clamped between the two top members 403A and 403B and the single bottom member 305. And the single bottom member 305 has threaded bore hole 210 to which aircraft elements may be attached. It is noted that the attachment mechanism provided by the bottom member 305 for aircraft elements could be modified, as desired, depending upon the nature of the desired attachment mechanism or aircraft element to be attached.

As indicated above, the two top members 403A and 403B and the bottom member 305 are preferably rigid structures. For example, these members can be made with a hollow shell construction to reduce weight of the stringer clip, while maintaining structural rigidity and strength of the stringer clip. The stringer clip can be produced using various methods and materials, such as injection molding production methods, SLA/SLS (Stereolithography Apparatus/Selective Last Sintering), casting production method, or machining production methods. Materials, such as plastic or metal, can be used. In addition, flame retardant material is preferably used for the stringer clip to allow for FAA (Federal Aviation Administration) usage. The stringer clip can thereby configured to be suitable for light to medium structural installation without requiring holes to be drilled into the aircraft structure. And the stringer clip can be used to attach and secure a wide variety of aircraft elements.

Figure 5:
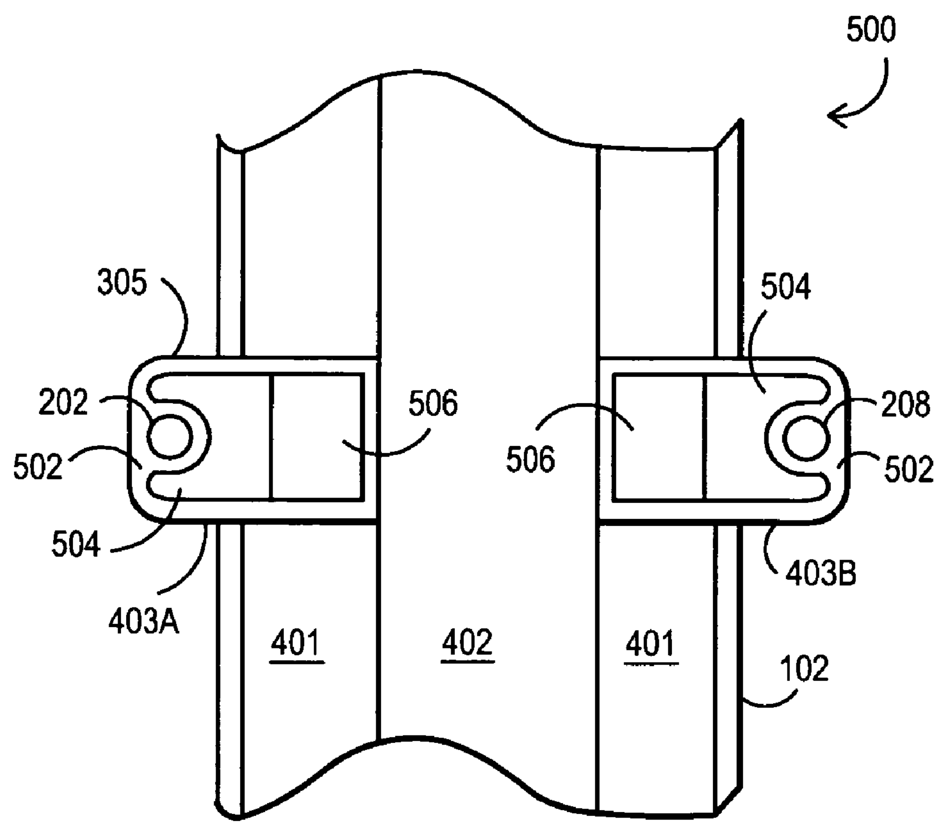
FIG. 5 is a bottom view of a stringer clip with respect to an aircraft stringer.

FIG. 5 is a top view 500 of a stringer clip with respect to an aircraft stringer 102. From this top view, the stringer top members 403A and 403B are depicted. In addition, the position of the threaded bore holes 202 and 208 are depicted. It is further noted that the top members 403A and 403B may be constructed of a rigid plastic or other molded material and can be configured to have hollowed out regions, if desired. As depicted in FIG. 4, areas 502 represent the bottom edges of the top members 403A and 403B. The regions 504 are recessed and shaped to match the contour of the opposing faces of the bottom member 305 and the edges of the flanges 401. The regions 506 are also recessed and shaped to match the contour of the stringer including flanges 401. A perspective view of the top members 403A and 403B is provided in FIG. 7 to show the hollowed out regions and contour.

Figure 6:
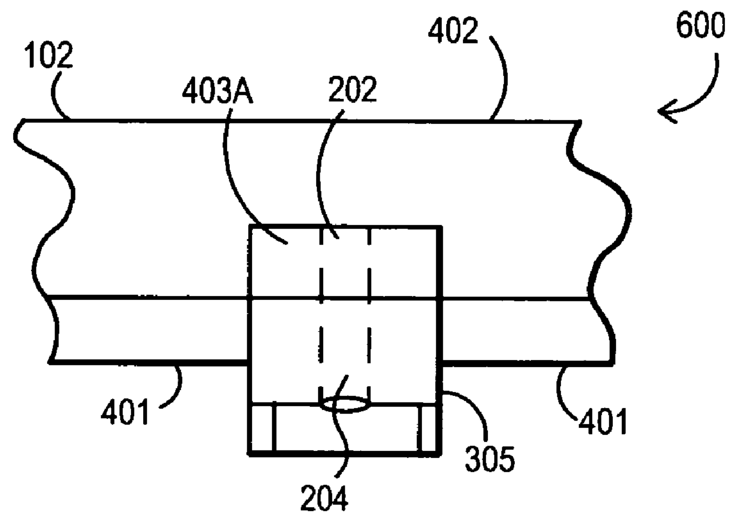
FIG. 6 is a side view of a stringer clip with respect to an aircraft stringer.

FIG. 6 is a side view 600 of a stringer clip with respect to an aircraft stringer 102. The top member 403A is positioned with respect to the bottom member 305. The threaded bore hole 202 and thru hole 204 are also depicted. The top edge 402 and flanges 401 of the aircraft stringer 102 are also indicated.

Figure 7:
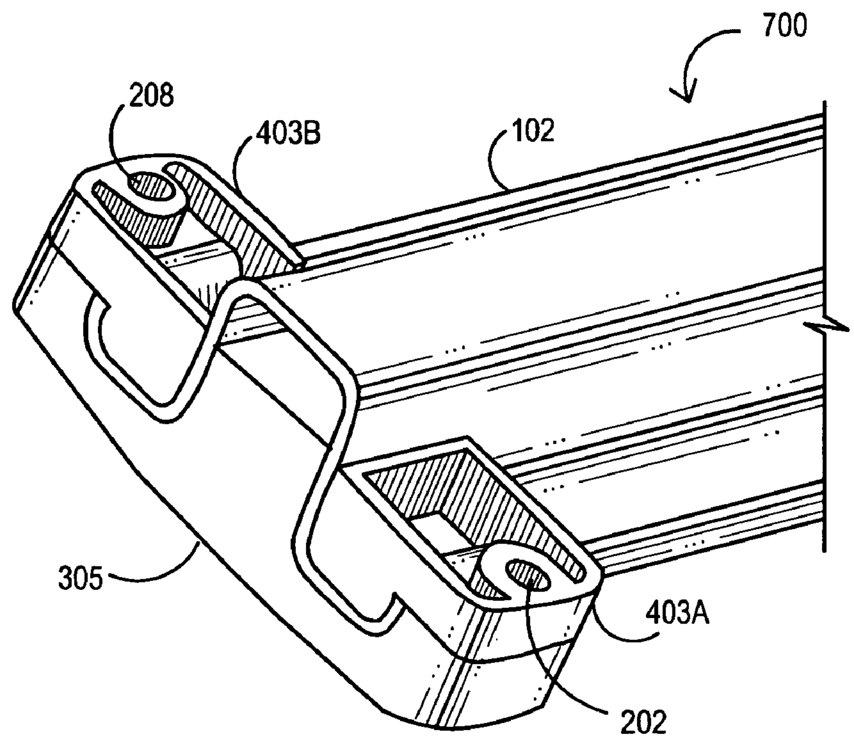
FIG. 7 is a top perspective view of a stringer clip with respect to an aircraft stringer.

FIG. 7 is a top perspective view 700 of a stringer clip with respect to an aircraft stringer 102. The bottom member 305 and the top members 403A and 403B are depicted. The bore holes 202 and 208 are also shown. As seen in FIG. 7, the top members 403A and 403B may be hollowed to reduce the amount of material used and shaped to conform to the stringer 102.

Figure 8:
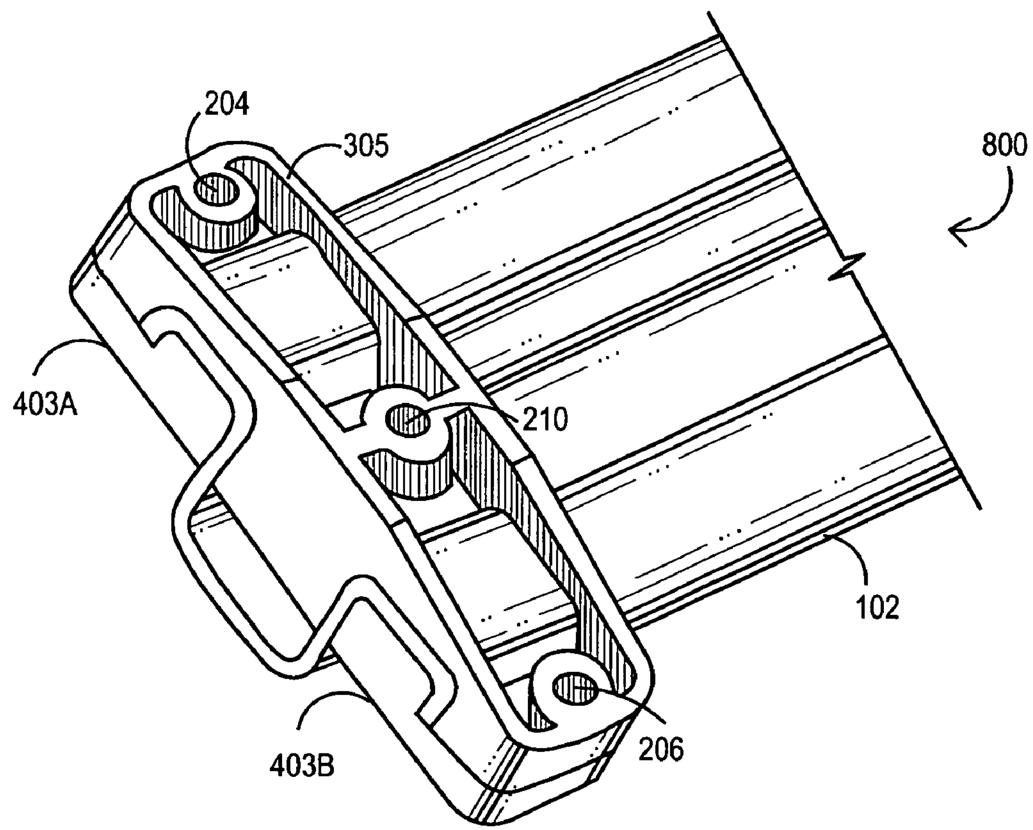
FIG. 8 is a bottom perspective view of a stringer clip with respect to an aircraft stringer.

FIG. 8 is a bottom perspective view 800 of a stringer clip with respect to an aircraft stringer 102. The bottom member 305 and the top members 403A and 403B are depicted. The bore holes 204, 206 and 210 are also shown. As seen in FIG. 8, the bottom member 305 may be hollowed to reduce the amount of material used and shaped to conform to the stringer 102.

As installed, therefore, the stringer clip is a three-piece assembly that is engagingly coupled to a stringer using opposing top and bottom members. The bottom member 305 spans the bottom width of the stringer 102 and attaches to the flanges 401 on both sides of the stringer 301 with the use of opposing top members 403A and 403B. Bolting the three member assembly of the stringer clip helps to prevent the stringer clip from slipping or loosening under load once an aircraft element is attached to the bottom member 305 through the threaded bore hole 210. In addition, using rigid pieces for the three piece clamp assembly of the stringer clip more evenly distributes load of an attachment across the stringer 102. Installation of the stringer clip only requires tightening of two screws or bolts, as opposed to drilling and installing fasteners, allowing for quick relocation and adjustability of the installation of the stringer clip.

Further modifications and alternative embodiments of the techniques described herein will be apparent to those skilled in the art in view of this description. It will be recognized, therefore, that the techniques described herein are not limited by these example arrangements. Accordingly, this description is to be construed as illustrative only and is for the purpose of teaching those skilled in the art the manner of carrying out the techniques described herein. It is to be understood that the forms of the techniques described herein shown and described are to be taken as the presently preferred embodiments. Various changes may be made in the implementations and architectures. For example, equivalent elements may be substituted for those illustrated and described herein and certain features of the techniques described herein may be utilized independently of the use of other features, all as would be apparent to one skilled in the art after having the benefit of this description of the techniques.

What is claimed is:

1. A stringer clip for attaching aircraft elements to an aircraft stringer, comprising:

a rigid bottom member having a first and second bore holes, the bottom member having a center portion configured to extend into and engage a center channel portion of a hat-shaped aircraft stringer, and the bottom member having a centrally disposed attachment mechanism for an aircraft element; and a first top member having a bore hole configured to engage the first bore hole on the bottom member, the first top member having a portion configured to engage an edge channel portion of a first flange portion of a hat-shaped aircraft stringer; and a second top member having a bore hole configured to engage the second bore hole on the bottom member, the second top member having a portion configured to engage an edge channel portion of a second flange portion of a hat-shaped aircraft stringer.

2. The stringer clip of claim 1, wherein the first and second bore holes for the bottom member and the bore holes for the first and second top members are threaded so that they are configured to be secured together use bolts.

3. The stringer clip of claim 1, wherein the first and second bore holes for the bottom member and the bore holes for the first and second top members include threaded inserts so that bottom member and the first and second top members are configured to be secured together use bolts.

4. The stringer clip of claim 1, wherein the bottom member and the first and second top members have a hollow shell construction.

5. The apparatus of claim 1, wherein the bottom member and the first and second top members are made from flame retardant material.

6. The stringer clip of claim 1, wherein the first and second top members are rigid.

7. The stringer clip of claim 1, wherein the bottom member and the first and second top members are configured to be resistant to rotation once engaged with a stringer.

8. The stringer clip of claim 1, wherein the bottom member and the first and second top members are constructed using a casting production method or an injection molding production method.

9. The stringer clip of claim 1, wherein the bottom member and the first and second top members are constructed using a metal material.

10. The stringer clip of claim 1, wherein the centrally disposed attachment mechanism for the bottom member comprises a threaded bore hole configured to receive a bolt.

11. The stringer clip of claim 1, wherein the centrally disposed attachment mechanism for the bottom member comprises a bore hole receiving a threaded insert configured to receive a bolt.

12. A method for attaching aircraft elements to an aircraft stringer, comprising:

providing a rigid bottom member having a first and second bore holes and a centrally disposed attachment mechanism;

providing a first top member having a bore hole configured to engage the first bore hole on the bottom member;

providing a second top member having a bore hole configured to engage the second bore hole on the bottom member;

providing a hat-shaped aircraft hanger having a center channel portion and a first and second flange portions;

engaging the center channel portion of the hat-shaped aircraft stringer with a center portion of the rigid bottom member;

engaging the first flange portion of the hat-shaped aircraft stringer with an edge channel portion of the first top member;

engaging the second flange portion of the hat-shaped aircraft stringer with an edge channel portion of the second top member;

securing the first and second top members and the bottom member using the bore holes so that the first and second top members and the bottom member are clamped to the stringer; and attaching an aircraft element to the centrally disposed attachment mechanism for the bottom member.

13. The method of claim 12, wherein bore holes are threaded, and wherein the securing step comprises securing the first and second bore holes for the bottom member and the bore holes for the first and second top members using bolts.

14. The method of claim 12, further comprising applying threaded inserts to the first and second bore holes for the bottom member and the bore holes for the first and second top members, and wherein the securing step comprises securing the first and second bore holes for the bottom member and the bore holes for the first and second top members using bolts.

15. The method of claim 12, further comprising utilizing a threaded bore hole for the centrally disposed attachment mechanism for the bottom member, and wherein the attaching step comprises attaching an aircraft element using a bolt.

16. The method of claim 12, further comprising utilizing a bore hole having a threaded insert for the centrally disposed attachment mechanism for the bottom member, and wherein the attaching step comprises attaching an aircraft element using a bolt.

17. The method of claim 12, wherein the attaching step comprises attaching a wire bundle to the centrally disposed attachment mechanism for the bottom member.

18. The method of claim 12, wherein the attaching step comprises attaching hydraulic lines to the centrally disposed attachment mechanism for the bottom member.

19. The method of claim 12, wherein the attaching step comprises attaching air conditioning conduits to the centrally disposed attachment mechanism for the bottom member.

20. The method of claim 12, wherein the attaching step comprises attaching electronic equipment to the centrally disposed attachment mechanism for the bottom member.

21. The method of claim 12, wherein the first and second top members are provided as rigid members.

22. The method of claim 12, wherein the attaching step comprises attaching a mechanical structure to the centrally disposed attachment mechanism for the bottom member.

* * * * *